US012762402B2

(12) United States Patent
Otto et al.

(10) Patent No.: US 12,762,402 B2
(45) Date of Patent: Oct. 13, 2026

(54) METHOD FOR TRAINING A CONTROL POLICY FOR CONTROLLING A TECHNICAL SYSTEM

(71) Applicant: Robert Bosch GmbH, Stuttgart (DE)

(72) Inventors: Fabian Otto, Tuebingen (DE); Gerhard Neumann, Karlsruhe (DE); Anh Vien Ngo, Nehren (DE); Hanna Ziesche, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 18/360,071

(22) Filed: Jul. 27, 2023

(65) Prior Publication Data

US 2024/0037393 A1 Feb. 1, 2024

(30) Foreign Application Priority Data

Jul. 28, 2022 (DE) ..................... 10 2022 207 800.4

(51) Int. Cl.
*G06N 3/00* (2023.01)
*G06N 3/08* (2023.01)

(52) U.S. Cl.
CPC ...................................... *G06N 3/08* (2013.01)

(58) Field of Classification Search
None
See application file for complete search history.

(56) References Cited

U.S. PATENT DOCUMENTS

| | | | | |
|---|---|---|---|---|
| 6,473,851 | B1 * | 10/2002 | Plutowski | G06N 20/00 706/5 |
| 10,766,136 | B1 * | 9/2020 | Porter | B25J 9/163 |
| 10,786,900 | B1 * | 9/2020 | Bohez | G06N 20/00 |
| 11,707,838 | B1 * | 7/2023 | Vogelsong | B25J 9/1671 700/246 |
| 2015/0100530 | A1 * | 4/2015 | Mnih | A63F 13/67 706/25 |
| 2018/0012137 | A1 * | 1/2018 | Wright | G05B 13/0265 |
| 2018/0129974 | A1 * | 5/2018 | Giering | G05B 13/029 |
| 2018/0222045 | A1 * | 8/2018 | Khansari Zadeh | G05B 19/423 |

(Continued)

OTHER PUBLICATIONS

11. Cadena et al, "Past, Present, and Future of Simultaneous Localization and Mapping: Toward the Robust-Perception Age," IEEE Transactions on robotics , 2016, pp. 1309-1332 (Year: 2016).*

*Primary Examiner* — Hafiz A Kassim
(74) *Attorney, Agent, or Firm* — Norton Rose Fulbright US LLP

(57) ABSTRACT

A method for training a control policy for controlling a technical system. The method includes training a neural network to implement a value function by: adapting the neural network for reducing a loss which, for a plurality of states and, for each state, for at least one action that has been previously carried out in the state, involves a deviation between a prediction for a cumulative reward and an estimation of the cumulative reward that is ascertained from a subsequent state that has been achieved by the action, and a reward that is obtained by the action. In the loss, for each action, the deviation for the action is weighted more strongly the greater the likelihood is that the action is selected by the control policy, in relation to the likelihood that the action is selected by a behavior control policy. The method also includes training the control policy.

6 Claims, 3 Drawing Sheets

(56) References Cited

U.S. PATENT DOCUMENTS

| | | | | |
|---|---|---|---|---|
| 2019/0130263 | A1* | 5/2019 | Düll | F02C 9/00 |
| 2019/0266489 | A1* | 8/2019 | Hu | G06N 3/006 |
| 2019/0287004 | A1* | 9/2019 | Bhoj | G06N 3/006 |
| 2020/0304545 | A1* | 9/2020 | Rao | G06F 18/2185 |
| 2020/0410343 | A1* | 12/2020 | Niu | G06N 3/092 |
| 2021/0003973 | A1* | 1/2021 | Chakrabarty | G06F 18/24133 |
| 2021/0078169 | A1* | 3/2021 | Cabi | B25J 9/161 |
| 2021/0178600 | A1* | 6/2021 | Jha | G06N 20/00 |
| 2021/0383218 | A1* | 12/2021 | Lu | G06N 3/092 |
| 2021/0387330 | A1* | 12/2021 | Mavrin | G06N 3/092 |
| 2022/0105624 | A1* | 4/2022 | Kalakrishnan | B25J 9/163 |
| 2023/0359208 | A1* | 11/2023 | Mueller | F41H 13/00 |
| 2024/0046112 | A1* | 2/2024 | Marris | G06N 3/092 |
| 2024/0330701 | A1* | 10/2024 | Jaderberg | G06N 3/0985 |

* cited by examiner

METHOD FOR TRAINING A CONTROL POLICY FOR CONTROLLING A TECHNICAL SYSTEM

CROSS REFERENCE

The present application claims the benefit under 35 U.S.C. § 119 of German Patent Application No. DE 10 2022 207 800.4 filed on Jul. 28, 2022, which is expressly incorporated herein by reference in its entirety.

FIELD

The present description relates to a method for training a control policy for controlling a technical system.

BACKGROUND INFORMATION

A robotic device (for example, a robotic arm or also a vehicle that is intended to be navigable through the surroundings) may be trained, using reinforcement learning (RL), for performing a certain task, for example in manufacturing. The performance of the task typically encompasses the selection of an action for each state of a sequence of states, i.e., may be regarded as a sequential decision problem. Depending on the states that are reached due to the selected actions, in particular the end state, each action results in a certain return, which determines, for example, whether the action allows reaching an end state which does or not yield a reward (for example, for achieving the objective of the task).

In reinforcement learning (RL) there are two main approaches for model-free learning: off-policy and on-policy. On-policy methods utilize (quasi)-online samples that are recreated by the target control policy (i.e., the control policy that is trained) during control runs. In contrast, off-policy methods revert to the reuse of samples from a replay buffer that is incrementally filled by a so-called behavior control policy for updating the target control policy. Although on-policy methods may compensate for outdated off-policy data to a certain degree with the aid of importance sampling, they are typically not able to make full use of the data. Therefore, in order to make full use of the data, typically off-policy methods are used which learn a state-action value function (also referred to as a Q function) as a so-called critic, i.e., as the entity that assesses an action that is selected by the control policy to be trained.

The dependency of the Q function on state and action allows it to train for actions from the target control policy, using transitions that have been generated by the behavior control policy. However, for high-dimensional action spaces the learning of a Q function is often undesirable and complex.

For this reason, approaches are desirable that allow the effective learning of a state-value function (also referred to as a V function), as used in on-policy methods, for an off-policy method.

SUMMARY

According to various specific embodiments of the present invention, a method for training a control policy for controlling a technical system is provided, including training a neural network to implement a value function which for each state of the technical system predicts a cumulative reward that may be obtained by controlling the technical system, starting from the state, by: adapting the neural network for reducing a loss which, for a plurality of states and, for each of the states, for at least one action that has been previously carried out in the state, involves a deviation between a prediction for the cumulative reward by the neural network and an estimation of the cumulative reward that is ascertained from a subsequent state that has been achieved by the action, and a reward that is obtained by the action. A behavior control policy is ascertained that reflects the selection of the previously carried out actions in the particular states of the plurality of states, and in the loss, for each action, the deviation for the action is weighted more strongly the greater the likelihood is that the action is selected by the control policy, in relation to the likelihood that the action is selected by the behavior control policy. The method also includes training the control policy so that it prioritizes (for example, outputs with a greater likelihood) actions that result in states for which the neural network predicts a higher value, over actions that result in states for which the neural network predicts a lower value.

The above-described method of the present invention allows an increase in the data efficiency by training a V function using off-policy samples. The V function may typically be learned more easily than a Q function.

According to an example embodiment of the present invention, in the above approach, the importance weights are taken into account in the optimization goal for the value function (V function), for example of a neural network that implements the V function. This may take place by optimizing a weakened version of the loss function for the V function (see below). The above-described method thus allows an efficient training of the V function. The replay buffer may obtain samples from various behavior control policies. This may be handled by regarding the samples as samples of a mixed distribution. The stability during learning may be increased by using a trust region adaptation of the neural network.

Various exemplary embodiments of the present invention are stated below.

Exemplary embodiment 1 is a method for training a control policy for controlling a technical system, as described above.

Exemplary embodiment 2 is the method according to exemplary embodiment 1, the loss for each of the plurality of states and the at least one action involving a value as a function of the difference between the estimation and the prediction, the value being weighted with the ratio of the likelihood that the action is selected by the control policy, to the likelihood that the action is selected by the behavior control policy.

This allows an efficient ascertainment of a loss, which in an off-policy approach is used for training the value function.

Exemplary embodiment 3 is the method according to exemplary embodiment 2, the value being an exponential power greater than 1 of the difference between the estimation and the prediction.

The use of an exponential power (greater than 1), and thus the use of a convex function, on the difference allows the same results as with use of a loss in which the deviations are weighted the same as with use of a loss in which the samples ascertained according to the behavior control policy are weighted. The loss may thus be computed more easily, and there is no need to assume that multiple actions have been carried out for each of the plurality of states.

Exemplary embodiment 4 is the method according to one of exemplary embodiments 1 through 3, the previously carried out actions being selected according to various control policies, and the behavior control policy being ascertained by weighted averaging of the various control policies.

The replay buffer, which contains samples with actions that are carried out for the plurality of states, may thus be successively filled with the aid of various control policies, and the deviations for the various samples from the replay buffer may be weighted, using the importance weights, so that the control policy is efficiently trained.

Exemplary embodiment 5 is a control device that is configured to carry out a method according to one of exemplary embodiments 1 through 4.

Exemplary embodiment 6 is a control device according to exemplary embodiment 5, which is further configured to control the technical system using the trained control policy.

Exemplary embodiment 7 is a computer program that includes commands which, when executed by a processor, prompt the processor to carry out a method according to one of exemplary embodiments 1 through 4.

Exemplary embodiment 8 is a computer-readable medium that stores commands which, when executed by a processor, prompt the processor to carry out a method according to one of exemplary embodiments 1 through 4.

In the figures, similar reference numerals generally refer to the same parts in all the various views. The figures are not necessarily true to scale, emphasis instead being placed in general on illustrating the principles of the present invention. In the following description, various aspects are described with reference to the figures.

DETAILED DESCRIPTION OF EXAMPLE EMBODIMENTS

The following detailed description relates to the figures, which for explanation show particular details and aspects of this disclosure in which the present invention may be carried out. Other aspects may be used, and structural, logical, and electrical modifications may be made, without departing from the scope of protection of the present invention. The various aspects of this description are not necessarily mutually exclusive, since some aspects of this description may be combined with one or multiple other aspects of this description to form new aspects.

Various examples are described in greater detail below.

Figure 1:
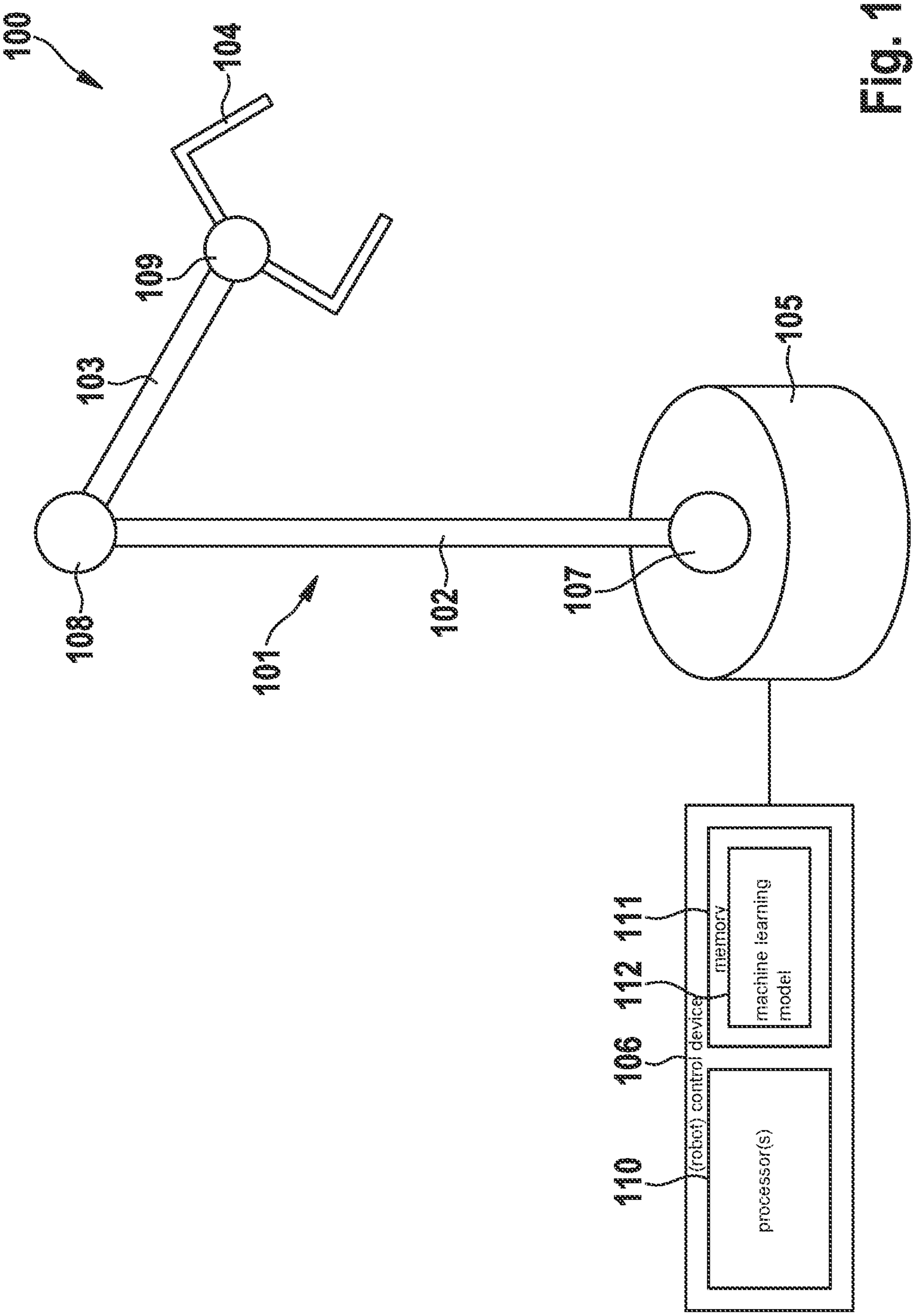
FIG. 1 shows a robot according to an example embodiment of the present invention.

FIG. 1 shows a robot 100.

Robot 100 includes a robotic arm 101, for example an industrial robotic arm for handling or mounting a workpiece (or one or multiple other objects). Robotic arm 101 includes manipulators 102, 103, 104 and a base (or support) 105 with the aid of which manipulators 102, 103, 104 are supported. The term "manipulator" refers to the movable components of robotic arm 101, whose actuation allows a physical interaction with the surroundings, for example to perform a task. For control, robot 100 contains a (robotic) control device 106 that is designed to implement the interaction with the surroundings according to a control program. Last component 104 (farthest from base 105) of manipulators 102, 103, 104 is also referred to as an end effector 104, and may contain one or multiple tools such as a welding torch, a gripping instrument, a painting tool, or the like.

The other manipulators 102, 103 (closer to base 105) may form a positioning device, so that together with end effector 104, robotic arm 101 with end effector 104 at its end is provided. Robotic arm 101 is a mechanical arm that may provide functions similarly to a human arm (possibly including a tool at its end).

Robotic arm 101 may include joint elements 107, 108, 109 that connect manipulators 102, 103, 104 to one another and to base 105. A joint element 107, 108, 109 may include one or multiple joints, each of which may provide a rotary movement (i.e. a rotation) and/or a translational movement (i.e., a displacement) of associated manipulators relative to one another. The movement of manipulators 102, 103, 104 may be initiated with the aid of actuators that are controlled by control device 106.

The term "actuator" may be understood as a component that is designed to effectuate a mechanism or process as a response to being driven. The actuator may implement instructions that are created by control device 106 (so-called activation) and convert them into mechanical movements. The actuator, for example an electromechanical converter, may be designed to convert electrical energy into mechanical energy as a response to being activated.

The term "control" may be understood as any type of logic-implementing entity that may include, for example, a circuit and/or a processor that are/is capable of executing software, firmware, or a combination thereof that is stored in a memory medium, and that may issue instructions, for example to an actuator in the present example. The control may be configured by program code, for example (software, for example) to control the operation of a system, a robot in the present example.

In the present example, control device 106 includes one or multiple processors 110, and a memory 111 that stores code and data on the basis of which processor 110 controls robotic arm 101. According to various specific embodiments, control device 106 controls robotic arm 101 based on a machine learning model 112 that is stored in memory 111 and that implements a control strategy (also referred to as a control policy).

Reinforcement learning (RL) is one option for learning a control policy. Reinforcement learning is characterized by a trial and error search and a delayed reward. In contrast to supervised learning of a neural network, which requires labels for learning, reinforcement learning uses a trial and error mechanism to learn an association of states with actions in such a way that a reward that is obtained is maximized. By use of trial and error, RL algorithms attempt to find the actions that result in higher rewards by testing various actions. The selection of an action has an effect not only on the reward of the present state, but also on the rewards of all subsequent states (of the present control run), and thus on a delayed (overall) reward or, in other words, a cumulative reward. Deep reinforcement learning (DRL) refers to the use of supervised learning for training of a neural network, which may either ascertain an approximated value for the delayed (or cumulative) reward or map states directly onto actions. The V function, which may be used in an actor-critic approach, for example, is a neural network, or in general a function that maps onto the associated cumulative reward (also referred to as the value).

Figure 2:
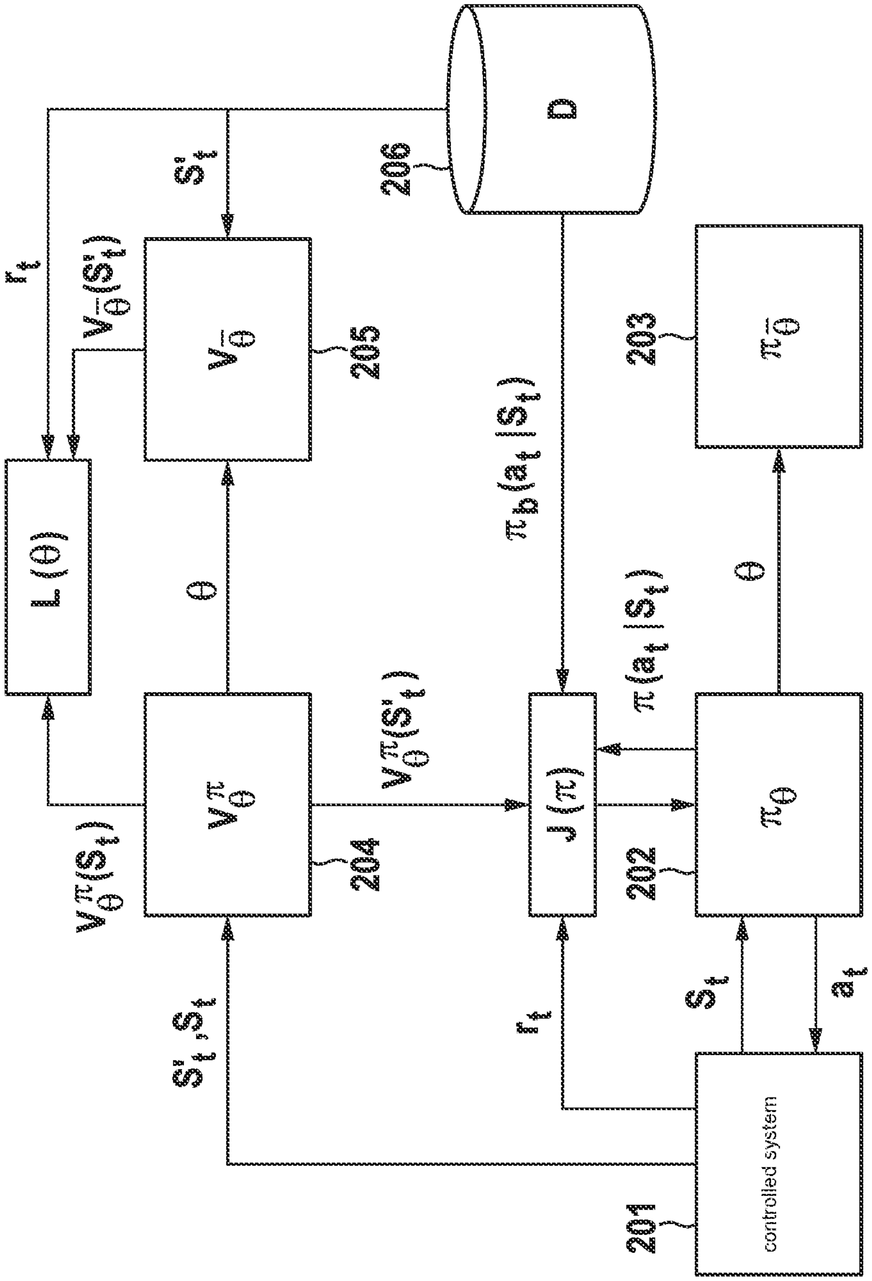
FIG. 2 illustrates an actor-critic approach for training a control policy for controlling a system, according to an example embodiment of the present invention.

FIG. 2 illustrates an actor-critic approach for training a control policy for controlling a system 201.

In this exemplary embodiment, there is a (neural) actuator network 202 and a target actuator network 203 as well as a critic network 204 and a target critic network 205.

All these neural networks are trained during the learning process. Target actuator network 203 and target critic network 205 are (slowly following) copies of actuator network 202 or of critic network 204. Target actuator network 203 slowly follows actuator network 202 (i.e., its weights are updated in such a way that they slowly change (for example, are shifted by control runs) in the direction of the weights of actuator network 202), and target critic network 205 slowly follows critic network 204 (i.e., its weights are updated in such a way that they slowly change (for example, are shifted by control runs) in the direction of the weights of critic network 205). The use of target networks for the actor and the critic increases the stability of the learning process.

The training takes place according to an off-policy method. Accordingly, there is a replay buffer 206 that stores a data set $D=\{(s_t, a_t, r_t, s_t')_{t=1 \ldots N}\}$ which a behavior control policy has generated by interaction with the controlled system. Each sample of D is a tuple (for a particular control time increment t) of a state, an action carried out in the state according to the behavior control policy, a reward obtained by this action, and reached subsequent state $(s_t, a_t, r_t, s_t')$. The behavior control policy is, for example, a mixture of old, i.e., previously selected or also previously trained, control policies.

Actor 202 implements control policy π that is to be presently trained; i.e., for a present state $s_t$ it selects a controlled system 201, and an action at which for the controlled system results in a subsequent state $s_t+1$ (or $s_t'$). Critic 204 assesses states that actor 202 reaches due to control actions that are selected by the actor. Actor 202 may thus be trained to select to the greatest possible extent control actions that reach (to the greatest possible extent) states with high assessments.

To deliver these assessments of states, critic 204 implements a V function $$V_\theta^\pi$$

that is learned in such a way that for each state $s_t$ it estimates the cumulative reward that is achieved starting from this state. Target critic network 205 implements a target version of the V function, denoted by reference symbol $V_{\bar{\theta}}$. Parameters θ and $\bar{\theta}$ denote the weights of the particular neural network.

V function 204 may be trained by searching for a minimum of the following loss function:

$$J(\theta) = \sum_t \left( V_\theta^\pi(s_t) - \frac{1}{K} \sum_j \frac{\pi(a_{t,j} \mid s_t)}{\pi_b(a_{t,j} \mid s_t)} y_{t,j} \right)^2 \tag{1}$$

where $y_{t,j}=r_{t,j}+\gamma V_{\bar{\theta}}(s'_{t,j})$ indicates the target value for the V function, γ is a discounting factor, and $a_{t,j}$ is the jth action which (according to replay buffer 206) has been carried out in state $s_t$. It is assumed that replay buffer 206 contains multiple samples for each state (i.e., multiple actions have been carried out for the same state, and for this purpose samples are present in replay buffer 206). However, in reinforcement learning this is typically unrealistic. This assumption is used here for determining the importance weight $$\frac{\pi(a_{t,j} \mid s_t)}{\pi_b(a_{t,j} \mid s_t)},$$

which is used for taking into account the difference between behavior control policy $\pi_b$, which has delivered the samples from replay buffer 206, and target control policy π.

However, since this assumption, as mentioned, is unrealistic, the above loss function is relaxed using Jensen's inequality, for example by $$L(\theta) = \sum_t \sum_j \frac{1}{K} \frac{\pi(a_{t,j} \mid s_t)}{\pi_b(a_{t,j} \mid s_t)} (V_\theta^\pi(s_t) - y_{t,j})^2 \tag{2}$$

Since the second summation here has been placed in front of the squared term in parentheses, both sums may be combined and written as a summation over importance weights and actions, i.e., $$L(\theta) = \sum_t \frac{\pi(a_t \mid s_t)}{\pi_b(a_t \mid s_t)} (V_\theta^\pi(s_t) - y_t)^2 \tag{3}$$

This loss function is now very similar to the loss function of a deep Q network (DQN), but it relates to the action-independent V function, and importance weights are introduced which take into account the difference between the behavior control policy and the target control policy. The difference may be evaluated without samples for various actions for the same state having to be present.

The loss function (3) is an upper limit for the loss function (1), and they have the same optima (which may be shown using Jensen's inequality). Therefore, it may be expected that a training of critic 205 for minimizing the loss function (3) delivers the same (or at least a similar) result as for the training for minimizing the loss function (1).

For more conservative estimations, mechanisms, such as those applied for DQN, for example the Huber loss, target networks (as in the example in FIG. 2), and a dueling architecture may be used. In addition, the importance weight in the form of a fraction (as in (1), (2), and (3)) may be replaced by a truncated importance sampling $$\min\left(\frac{\pi(a_t \mid s_t)}{\pi_b(a_t \mid s_t)}, \epsilon\right),$$

where ε is a user-defined upper limit (ε=1, for example).

Behavior control strategy $\pi_b$ may be selected differently. One option is to set $\pi_b$ to a mixture of M preceding control policies with weighting $w_i$ (for example, all control policies that have contributed to replay buffer 206):

$$\pi_b(a \mid s) = \sum_{i=0}^{M} w_i \pi_i(a \mid s) \tag{4}$$

where $\Sigma w_i=1$ and $w_i \leq 0$. However, for each sample this requires a forward run for all neural networks implementing the preceding control policies. Another option is to also carry out Polyak averaging $\bar{\phi}$ of the weights of the preceding control policies according to $$\bar{\phi}_{t+1}=(1-\alpha)\bar{\phi}_t+\alpha\phi \quad (5)$$

(where t here indicates the versions of the preceding control policies), and control strategy $\pi_{\bar{\phi}}(a|s)$ given by these weights determines the importance weights (i.e., the denominator of the fraction that represents the importance weights). Alternatively, the Polyak averaging of the likelihoods themselves may be ascertained in order to obtain an estimation for the mixed distribution:

$$\pi_b^{t+1}(a|s) = (1-\alpha)\pi_b^t(a|s) + \pi(a|s) \quad (6)$$

Control policy $\pi$ may be enhanced (i.e., trained) using the content of replay buffer 206. For this purpose, an off-policy estimation of the V function may be used instead of an on-policy estimation, as the result of which the efficiency of the training is improved significantly.

For example, loss $$J(\pi) = \frac{1}{Z}\sum_t \frac{\pi(a_t \mid s_t)}{\pi_b(a_t \mid s_t)} A_t \quad (7)$$

may be used, where $A_t=r_t+\gamma V_\theta(s'_t)-V_\theta(s_t)$ is the advantage function (superscript $\pi$ is omitted here in the V function for simplicity), which uses a one-step return that is ascertained using the value function. The control policy (for example, a neural network that implements it) may be optimized using this loss, utilizing an algorithm that uses the gradient of the loss, in particular using trust region layers.

Replay buffer 206 may be initially filled with the aid of random trajectories. V function 204 and control policy 202 are subsequently updated, for example in alternation, using the above-described approaches, and new samples are generated using present control policy 202. The newly generated samples are stored in replay buffer 206 and used in the further training.

If a trust region layer approach is used, the reference control policy for the trust region layer is updated, for example after every epoch (after 1000 updates, for example).

The behavior control policy is ascertained or updated, for example, according to one of the three types described above.

Figure 3:
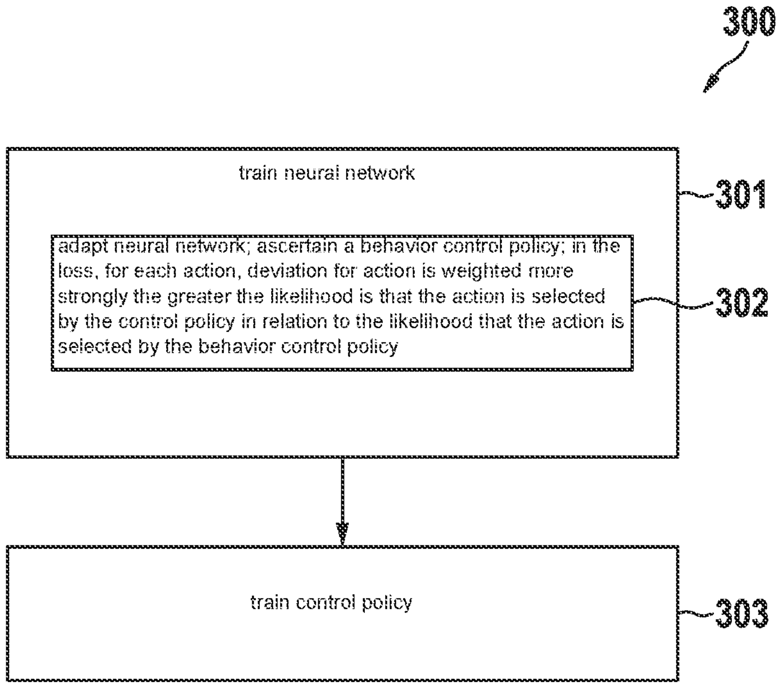
FIG. 3 shows a flowchart illustrating a method for training a control policy for controlling a technical system according to one specific embodiment of the present invention.

In summary, according to various specific embodiments a method is provided as illustrated in FIG. 3.

FIG. 3 shows a flowchart 300 illustrating a method for training a control policy for controlling a technical system according to one specific embodiment.

A neural network is trained in 301 in order to implement a value function which, for each state of the technical system, predicts a cumulative reward that may be obtained by controlling the technical system, starting from the state. This takes place in 302 by

- adapting the neural network for reducing a loss which, for a plurality of states and, for each of the states, for at least one action that has been previously carried out in the state, involves a deviation between a prediction for the cumulative reward by the neural network and an estimation of the cumulative reward that is ascertained from a subsequent state that has been achieved by the action, and a reward that is obtained by the action,
- a behavior control policy being ascertained that reflects the selection of the previously carried out actions in the particular states of the plurality of states, and
- in the loss, for each action, the deviation for the action is weighted more strongly the greater the likelihood is that the action is selected by the control policy, in relation to the likelihood that the action is selected by the behavior control policy.

The control policy is trained in 303 in such a way that it prioritizes (for example, outputs with a greater likelihood) actions that result in states for which the neural network predicts a higher value, over actions that result in states for which the neural network predicts a lower value.

It is to be noted that 301 and 303 may take place in alternation; i.e., there are multiple training iterations for the neural network and the control policy (which may be implemented by a second neural network), which alternate mutually or in parallel.

The method from FIG. 3 may be carried out by one or multiple computers that include one or multiple data processing units. The term "data processing unit" may be understood as any type of entity that enables the processing of data or signals. The data or signals may be treated, for example, according to at least one (i.e., one or more than one) particular function that is carried out by the data processing unit. A data processing unit may include an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination of same or may be formed from same. Any other way of implementing the particular functions, described in greater detail herein, may also be understood as a data processing unit or logic circuit system. One or multiple of the method steps described in detail here may be carried out (implemented, for example) by a data processing unit via one or multiple particular functions that are carried out by the data processing unit.

The approach from FIG. 3 is used to generate a control signal for a robotic device. The term "robotic device" may be understood to mean any technical system (including a mechanical part whose movement is controlled), such as a computer-controlled machine, a vehicle, a household appliance, a power tool, a production machine, a personal assistant, or an access control system. A control rule for the technical system is learned, and the technical system is then correspondingly controlled. For example, generating an action (and a corresponding control signal) involves generating a continuous value or multiple continuous values (i.e., carrying out a regression), such as for a distance, a speed, or an acceleration (according to which a robotic device or a portion thereof is then moved, for example).

Various specific embodiments may receive and use sensor signals from various sensors such as video sensors, radar sensors, LIDAR sensors, ultrasonic sensors, motion sensors, thermal imaging sensors, etc., in order to obtain, for example, sensor data concerning demonstrations or states of the system (robot and object or objects) as well as configurations and scenarios. The sensor data may be processed. This may include classifying the sensor data or carrying out a semantic segmentation on the sensor data, for example to detect the presence of objects (in the surroundings in which the sensor data have been obtained). Specific embodiments may be used to train a machine learning system and control a robot, for example autonomously by robot manipulators, in order to implement various manipulation tasks under various scenarios. In particular, specific embodiments for controlling and supervising the performance of manipulation tasks may be applied in assembly lines, for example. They may be integrated, seamlessly, for example, into a conventional GUI for a control process.

Although particular specific embodiments have been illustrated and described here, it is recognized by those skilled in the art in the field that the particular specific embodiments shown and described may be exchanged with numerous alternative and/or equivalent implementations without departing from the scope of protection of the present invention. The present patent application is intended to encompass any adaptations or variations of the particular specific embodiments discussed here.

What is claimed is:

1. A method for training a control policy for controlling a robotic device the method comprising the following steps:

receiving, by a processor, sensor data from one or more sensors associated with the robotic device, the sensor data representing states of the robotic device interacting with a physical environment;

training, by the processor, a neural network to implement a value function which, for each state of the robotic device, predicts a cumulative reward that may be obtained by physically controlling the robotic device, starting from the state, by:

adapting the neural network for reducing a loss which, for a plurality of states and, for each of the states, for at least one action that has been previously carried out in the state, involves a deviation between a prediction for the cumulative reward by the neural network and an estimation of the cumulative reward that is ascertained from a subsequent state that has been achieved by the action, and a reward that is obtained by the action, ascertaining a behavior control policy that reflects a selection of the previously carried out actions in the respective states of the plurality of states, and wherein in the loss, for each action, the deviation for the action is weighted more strongly the greater a likelihood is that the action is selected by the control policy, in relation to a likelihood that the action is selected by the behavior control policy;

training the control policy so that it prioritizes actions that result in states for which the neural network predicts a higher value, over actions that result in states for which the neural network predicts a lower value;

generating, using the trained control policy, a control signal that causes the robotic device to physically perform a task in the physical environment.

2. The method as recited in claim 1, wherein the loss for each of the plurality of states and the at least one action involves a value as a function of a difference between the estimation and the prediction, the value being weighted with a ratio of the likelihood that the action is selected by the control policy to the likelihood that the action is selected by the behavior control policy.

3. The method as recited in claim 2, wherein the value is an exponential power greater than 1 of the difference between the estimation and the prediction.

4. The method as recited in claim 1, wherein the previously carried out actions are selected according to various control policies, and the behavior control policy is ascertained by weighted averaging of the various control policies.

5. A control device configured to train a control policy for controlling a robotic device, the control device comprising a processor and a non-transitory memory storing instructions that, when executed by the processor, cause the control device to:

receive, by the processor, sensor data from one or more sensors associated with the robotic device, the sensor data representing states of the robotic device interacting with a physical environment;

train, by the processor, a neural network to implement a value function which, for each state of the robotic device, predicts a cumulative reward that may be obtained by controlling the robotic device, starting from the state, by:

adapting the neural network for reducing a loss which, for a plurality of states and, for each of the states, for at least one action that has been previously carried out in the state, involves a deviation between a prediction for the cumulative reward by the neural network and an estimation of the cumulative reward that is ascertained from a subsequent state that has been achieved by the action, and a reward that is obtained by the action, ascertaining a behavior control policy that reflects a selection of the previously carried out actions in the respective states of the plurality of states, wherein in the loss, for each action, the deviation for the action is weighted more strongly the greater a likelihood is that the action is selected by the control policy, in relation to a likelihood that the action is selected by the behavior control policy;

train the control policy so that it prioritizes actions that result in states for which the neural network predicts a higher value, over actions that result in states for which the neural network predicts a lower value; and generate, using the trained control policy, a control signal that causes the robotic device to physically perform a task in the physical environment.

6. A non-transitory computer-readable medium on which is stored a computer program including commands training a control policy for controlling a robotic device, the commands, when executed by a processor, causing the processor to perform the following steps:

receiving, by the processor, sensor data from one or more sensors associated with the robotic device, the sensor data representing states of the robotic device interacting with a physical environment;

training, by the processor, a neural network to implement a value function which, for each state of the robotic device, predicts a cumulative reward that may be obtained by controlling the robotic device, starting from the state, by:

adapting the neural network for reducing a loss which, for a plurality of states and, for each of the states, for at least one action that has been previously carried out in the state, involves a deviation between a prediction for the cumulative reward by the neural network and an estimation of the cumulative reward that is ascertained from a subsequent state that has been achieved by the action, and a reward that is obtained by the action, ascertaining a behavior control policy that reflects a selection of the previously carried out actions in the respective states of the plurality of states, wherein in the loss, for each action, the deviation for the action is weighted more strongly the greater a likelihood is that the action is selected by the control policy, in relation to a likelihood that the action is selected by the behavior control policy; and training the control policy so that it prioritizes actions that result in states for which the neural network predicts a higher value, over actions that result in states for which the neural network predicts a lower value; and generating, using the trained control policy, a control signal that causes the robotic device to physically perform a task in the physical environment.

* * * * *